(12) United States Patent
Lohr et al.

(10) Patent No.: US 6,568,735 B1
(45) Date of Patent: May 27, 2003

(54) SUSPENDED SEAT LATERALLY FIXED ON A STRUCTURAL VERTICAL MEMBER FOR TRANSPORT VEHICLE

(75) Inventors: Robert Lohr, Hangenbieten (FR); Jean-Luc Andre, Obernai (FR); Didier Mandart, Bischheim (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 10/130,082

(22) PCT Filed: Nov. 22, 2000

(86) PCT No.: PCT/FR00/03251
§ 371 (c)(1),
(2), (4) Date: May 10, 2002

(87) PCT Pub. No.: WO01/38129
PCT Pub. Date: May 31, 2001

(30) Foreign Application Priority Data

Nov. 22, 1999 (FR) .................................. 99 14669

(51) Int. Cl.$^7$ ................................................. B60N 2/68
(52) U.S. Cl. .................... 296/63; 297/244; 297/248; 297/452.39; 297/452.65
(58) Field of Search .............. 296/63, 64; 297/183.7, 297/183.6, 233, 244, 248, 452.19, 452.2, 452.39, 452.65, DIG. 2

(56) References Cited

U.S. PATENT DOCUMENTS

| | | | |
|---|---|---|---|
| 2,450,093 A | * 9/1948 | Richardson | 297/183.7 |
| 3,625,565 A | 12/1971 | Barecki | 297/450 |
| 3,630,566 A | 12/1971 | Barecki | 296/63 |
| 3,632,159 A | * 1/1972 | Barecki | 296/63 |
| 3,737,198 A | * 6/1973 | Barecki et al. | 297/450.1 |
| 3,747,979 A | * 7/1973 | Barecki | 296/63 |
| 3,762,764 A | 10/1973 | McJunkin | 297/14 |
| 3,797,887 A | 3/1974 | Barecki et al. | 297/454 |
| 3,802,738 A | * 4/1974 | Tantlinger | 297/183.7 |
| 3,893,729 A | 7/1975 | Sherman et al. | 297/118 |
| 3,899,211 A | * 8/1975 | Barecki | 296/63 |
| 3,944,283 A | 3/1976 | Molzon | 297/454 |
| 3,951,454 A | * 4/1976 | Tantlinger | 297/183.7 |
| 4,036,527 A | 7/1977 | Faul | 297/454 |
| 4,088,367 A | 5/1978 | Atkinson et al. | 297/457 |
| 4,118,061 A | * 10/1978 | Atkinson et al. | 296/63 |
| 4,249,769 A | 2/1981 | Barecki | 296/65 A |
| 4,252,341 A | * 2/1981 | Barecki et al. | 297/DIG. 2 |
| 4,275,925 A | 6/1981 | Harder, Jr. | 297/444 |
| 4,600,241 A | 7/1986 | Fujii et al. | 297/457 |
| 4,890,884 A | * 1/1990 | Olson | 297/232 |
| 5,464,273 A | 11/1995 | Makoto | 297/232 |
| 2001/0030455 A1 | * 10/2001 | Craft et al. | 297/248 |

FOREIGN PATENT DOCUMENTS

| | | | |
|---|---|---|---|
| DE | 44 03 460 A1 | 8/1995 | B60N/2/50 |
| FR | 2 306 659 | 11/1976 | A47C/3/16 |

* cited by examiner

Primary Examiner—D. Glenn Dayoan
Assistant Examiner—Jason Morrow
(74) Attorney, Agent, or Firm—Davis & Bujold, P.L.L.C.

(57) ABSTRACT

The invention concerns a seat made of two parts: a seat body (1) with a two-sided structure, for example shaped like a hollow box open at its front face, comprising linking and reinforcing crosspieces (5) providing it with sufficient mechanical rigidity; and a seat support (2) with a matching anatomy, preferably fitted with a cover containing a thickness of padding material (18), closing the opening (17) of the seat body (1). One of the later flanks or components (3) of the flank or (4) of the seat body (1) is fixed on a structural vertical member (11) of the public transport vehicle. The seat is suspended cantilevered against the vehicle wall, thereby leaving free the space (12) located beneath the seat. The invention is of interest to manufacturers of public transport vehicles and manufacturers of fittings for the vehicles.

21 Claims, 10 Drawing Sheets

SUSPENDED SEAT LATERALLY FIXED ON A STRUCTURAL VERTICAL MEMBER FOR TRANSPORT VEHICLE

FIELD OF THE INVENTION

The present invention concerns a seat, a banquette, or other seating support for a passenger transport vehicle designed to be cantilevered to a vertical support on the vehicle. The seat is attached by one of its lateral walls in order to free the space between the lower portion of the seat and the vehicle floor.

BACKGROUND OF THE INVENTION

The seats conventionally used in public transportation vehicles are usually attached to the vehicle floor by means of one or more legs of various shapes and sizes depending upon the seat design. This method has numerous disadvantages.

The legs are annoying to passengers because they prevent those who are seated from extending their legs comfortably.

Additionally, if the vehicle is crowded, the central aisle, the entryways, and exits should remain as empty as possible to accommodate a large number of passengers. If the seat supports block the space beneath the seats, passengers cannot stow their packages and large suitcases there, nor can the passengers standing in the aisle slide their toes under the seats.

This type of base attaching the seat to the floor is equally problematic for workers cleaning public transportation vehicles. The legs make it necessary to work around the seat base when cleaning the vehicle floor, which limits the use of robotic cleaning apparatus. Thus, both cleaning time and costs are quite high.

SUMMARY OF THE INVENTION

The aim of the invention is to provide a seat for a public transport vehicle, such as an urban vehicle, that has a simple economical structure, allows passengers to be seated quickly and easily, and frees the space below it.

To overcome this technical problem, the seating device of the invention has a very simple structure formed of two parts:
- two side pieces with vertical and horizontal branches joined by at least one connecting and reinforcing cross piece to form the seat body; and
- at least one seat support covering the seat body, preferably anatomically design and covered with a layer of padding.

One of the side pieces is added and attached only by its vertical branch to a vertical structure or other element of the body of the public transportation vehicle using attachment means such as bolts.

Additionally, the width of the seat is determined only by positioning the at least one connecting and reinforcing cross piece.

The seat of the invention, held in place by a lateral attachment device, is suspended and cantilevered from the vertical element and, more generally, from the wall. Thus, the space beneath it remains completely free.

This arrangement is particularly advantageous. For example, seated passengers can extend their legs without interference from the legs of the seat in front of them.

If the vehicle is crowded, passengers can place their packages and baggage underneath the seat, freeing the aisles, the entrances, and the exits. Passengers who are standing in the aisle can also slide the tips of their feet beneath the seats.

From an esthetic point of view, the absence of legs attaching seats to the floor gives the impression of a larger interior space since there are no lines breaking the perspective.

The entire floor surface of a train car is visible in a single glance, allowing passengers to quickly determine if they have forgotten anything. During terrorist alerts, there is improved security because suspicious packages or baggage can be readily detected.

Furthermore, cleaning and maintaining the public transportation vehicle is much simpler because the entire floor is easily accessible. It is possible to use cleaning robots for quickly, efficiently and economically cleaning the vehicle floor. For example, it would be possible to use robots passing through the central aisle equipped with arms that sweep beneath the seats.

Moreover, since the structure is so simple, the unit manufacturing cost of the seat according to the invention is reduced. Installing such a seat is simple and quick.

The seat according to the present invention is modular. This makes it possible to have a single-person version, a multi-person version with side-by-side seats, and a multi-person version with suspended back-to-back seats in accordance with the invention. These variations can be achieved using a specific seat body or by simply attaching several basic units of seats, according to the invention, to one another.

Since the seat is preferably symmetrical, it can be attached to either of the interior walls of the public transportation vehicle.

The seat can be quickly and easily adapted to specific needs. For instance, if the interior of the vehicle is being refurbished or temporarily rearranged, the seat can be dismantled, resized, removed, or otherwise modified according to need. It can also easily be customized and easily recustomized. The background color can be changed quickly by replacing the seat cover.

BRIEF DESCRIPTION OF THE DRAWINGS

The invention will now be described, by way of example, when reference to the accompanying drawings in which.

DETAILED DESCRIPTION OF THE INVENTION

Figure 1:
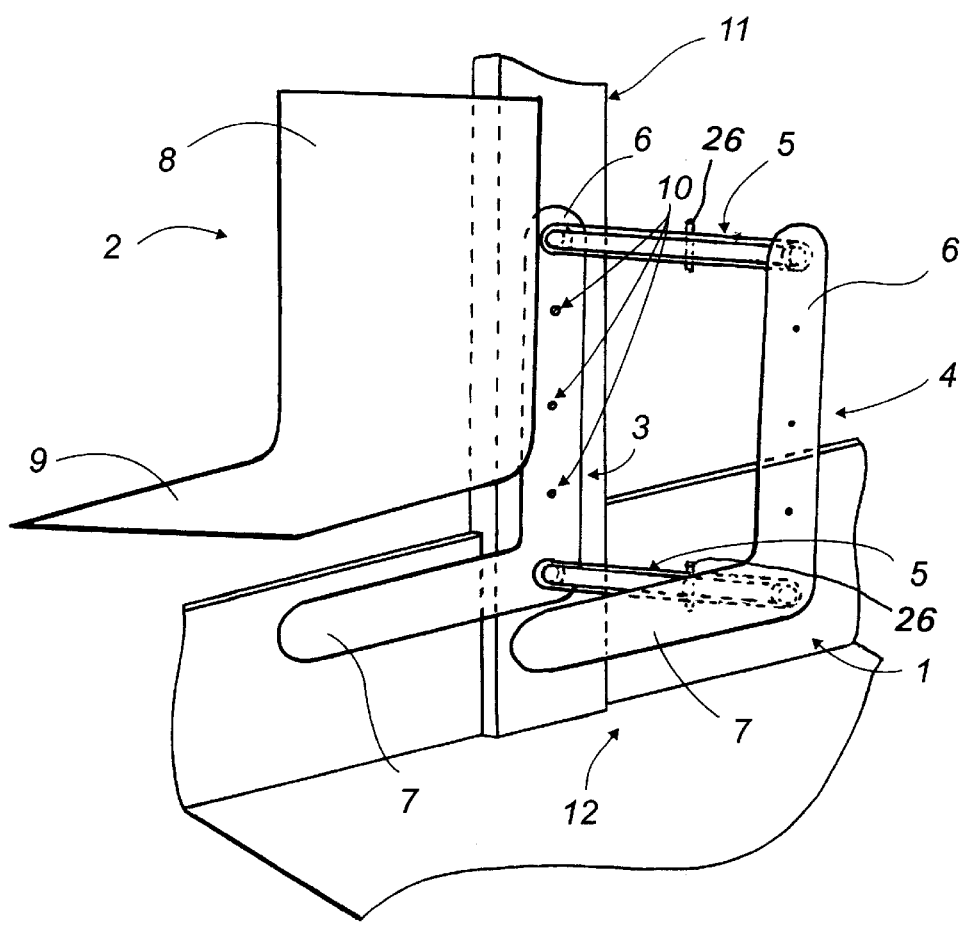
FIG. 1 is a schematic perspective of a front of a single-person suspended seat according to the basic version of the invention with the seat support shown offset in space.

The suspended seating device according to the present invention will now be described in detail with reference to FIGS. 1 through 10. Equivalent elements in different drawings will bear the same reference numerals.

The invention proceeds from the generally inventive concept that consists of creating a seat for passengers in a public transportation vehicle using two side elements joined by at least one and preferably two cross pieces, with the side elements and the cross pieces together forming the body of the seat. The width of said seat body is determined by the length of its single or multiple cross piece(s) and the seat is completed when at least one seat support formed of a single piece of the appropriate width is attached to the seat body. The unit has a covering and it may include auxiliary adapted elements, forming a complete seat ready to be placed inside a public transportation vehicle or laterally joined to a second seat to form a two-person unit.

One of the novel features of the invention concerns the side pieces, at least one of which comprises a means for attachment to a wall or to a vertical element, for example, a vertical structural element on the car body being equipped with seats, while the other allows it to be joined or connected with a second identical seat to form a two-person unit.

In the different drawings, one seat has been shown. This seat is designed to be attached inside a public transportation vehicle, particularly an urban vehicle such as, for example, a tramway, a metro, a bus, or any other urban passenger transport vehicle. There are other conceivable uses for the suspended seat which remain within the scope of the invention, specifically, in a train car, a railway station, a waiting area for an urban transport vehicle, or any other location where it would be advantageous to maintain free space below the seats.

The seat has a very simple structure consisting of two main portions: a seat body 1 and a seat support 2.

First, the basic variation of the suspended seat of the present invention shown in FIGS. 1 and 2 will be described, with FIG. 1 showing a single-person seat and FIG. 2 a two-person, back-to-back seat unit.

Seat body 1 consists of two side pieces 3 and 4 joined by one or more connecting and reinforcing cross pieces 5 to confer adequate mechanical rigidity. Side pieces 3 and 4 each are made from an essentially flat piece; preferably, they are essentially identical and may be made of metal, particularly aluminum. The side pieces are generally L-shaped in the single-person seat of FIG. 1 and they are shaped like an upside down T in the two-person seat of FIG. 2.

The connecting and reinforcing cross pieces 5 are preferably two in number. They may be tubular in shape and they extend perpendicular to the two side pieces 3 and 4, which they preferably connect at the terminal portions of vertical branch 6 of the L or the T. These cross elements 5 may have a different diameter or sectional shape from what is shown without departing from the scope of the invention. It would also be possible to use one or more transverse reinforcing plates.

When it is important to adapt the width of the seat, a variation with variable length cross pieces 5 is proposed.

This may consist of cross pieces 5 made of two telescoping pieces that fit inside each other. For safety reasons, these parts are prevented from pivoting by longitudinal blocking structures: grooves, slots, or the like. They are longitudinally immobilized with transverse elements 26: pins, pegs, or other projecting elements.

The body of seat 1, consisting of the two side pieces 3 and 4 joined by connecting and reinforcing cross pieces 5, is preferably formed of a single piece, particularly molded aluminum, but not necessarily that material. It may also be composed of several independent pieces that have been previously assembled to form seat body 1.

An anatomically shaped seat support 2 is attached to seat body 1 to receive the passenger's body. Seat support 2 is shown here in the form of a single thin plate, generally rectangular, curved and following the contour formed by the generally horizontal branches 7 and vertical branches 6 of side pieces 3 and 4 on which it rests. Seat support 2 thus comprises an upper portion 8 serving as the back and a lower portion 9 on which the passenger sits. The back support is preferably formed of a single piece but it may also be made by joining several constituent elements.

Seating support 2 is made of a single piece, for example by molding or some other method, with dimensions corresponding to the seating area desired.

Seat support 2 may also be made of a shaped element produced as a very large piece and sectioned into the desired length to form a piece of suitable width for attachment to the seat body.

Seat support 2 is positioned or otherwise attached to the body of seat 1 and maintained using some type of attachment means that is not shown.

Removal is more or less difficult depending upon the method chosen to join and maintain seat body 1 and seat support 2. For example, rapid attachment means—clips, pins, hooks, or the other similar means—can be used when quick, easy dismantling is desirable.

Figure 2:
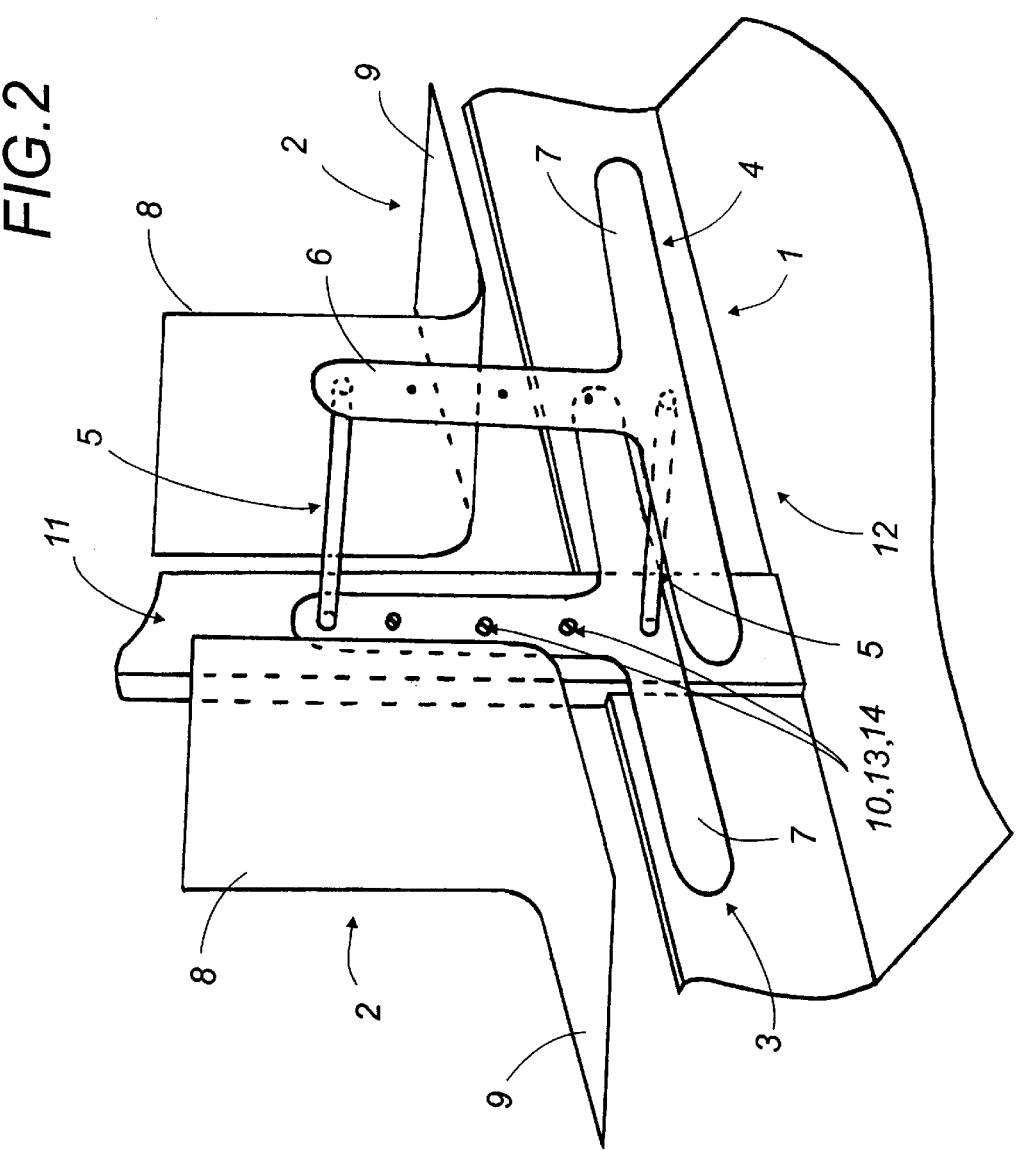
FIG. 2 is a schematic perspective of the front of the basic version of two-person suspended seat with back-to-back seats with the seat support shown offset in space.

The two-person embodiment shown in FIG. 2 comprises two identical seat supports 2 arranged back-to-back and symmetrical in relation to vertical branch 6 of the T. Each of these two seat supports 2 rests on an edge of vertical branch 6 and half of the horizontal branch 7 of each of the two side pieces 3 and 4. These two seat supports 2 are maintained in position on seat body 1 by some attachment means which is not shown. This embodiment of the seat of the invention allows two passengers to sit simultaneously back-to-back on the seat.

The seat support may comprise a covering enclosing a layer of padding, constituting a complete seat ready to place in position. Certain adapted auxiliary pieces (not shown) such as, for example, a restraint device, a headrest, or armrests may also be used without departing from the scope of the invention.

Obviously, the length of connecting and reinforcing cross pieces 5 can be increased in order to enlarge the body of seat 1. A seat support 2 of corresponding width is then put in place, resulting in a multi-person banquette type of seat. A variation with several individual juxtaposed seat supports 2 is also possible.

One of the side pieces 3 or 4 comprises attachment elements 10 for laterally affixing the seat at its vertical branch 6 only to a support 11, for example, a vertical structural support or to any other part of the vehicle body that has been adapted to hold seats. The seat, cantilevered on the vertical support, is suspended above the floor. Lower space 12 beneath the seat is thus completely free.

Any type of attachment means 10 may be used. For example, there may be a system of screws or bolts 13 cooperating with openings 14, which may or may not be threaded, formed in the wall of the side piece 3 or 4 being used and possibly with screw elements that are not shown.

The opposite side piece, for example piece 4, may also have openings 14 or some other equivalent device. Thus, the seat of the invention may advantageously be used with any vertical support structure 11 regardless of which side of the vehicle the support is located on and regardless of the orientation of the seat.

This arrangement makes it possible for two chairs of the present invention to be joined by laterally attaching them to each other. Thus, a multi-passenger suspended seat can be created by successively joining one or more identical single-passenger seats to a first seat that is cantilevered on a vehicle support structure. This embodiment is the equivalent of the banquette type variation previously described. It is also possible to join two two-person seats in this way with the seats back-to-back, resulting in a suspended unit providing seating for four passengers.

The preferred embodiment of the suspended seat according to the invention will now be described with reference to FIGS. 3 through 10.

As in the preceding variation, the said seat has a very simple two part structure consisting of a seat body 1 and a seat support 2.

This time the seat body 1 is formed of a single piece which may be, but is not necessarily, molded aluminum. It is formed as a hollow shell with a rear wall 15, a lower wall 16, two side walls 3 and 4 equivalent to the two preceding side pieces, and it has an opening 17 on its front surface.

The seat body or shell 1 surrounds one or more connecting and reinforcing cross pieces 5 to give the seat body sufficient mechanical rigidity. The connecting and reinforcing elements, which may be tubular, are preferably two in number. They extend perpendicular to the two side walls 3 and 4 which they connect, preferably at the upper portion and the curve between rear wall 15 and lower wall 16.

These connecting and reinforcing cross pieces 5 may be formed of the same piece as shell 1 or they may be connected later to the inside of the shell using some type of attachment means, for example, screws.

Seat support 2 is shown in this variation as a thin plate, essentially rectangular, with a shape and a profile that correspond to opening 17 in the seat body. This seat support 2 is curved and anatomically designed so the upper portion 8 conforms to the passenger's back and the lower portion 9 conforms to the buttocks.

Seat support 2 is attached to seat body 1 by placing it over front surface opening 17. It is maintained in position with some sort of attachment, a means of locking it into the seat or immobilization, that is not shown. It may further comprise a layer of padding 18 to increase the comfort of passengers using the seat.

Figure 8:
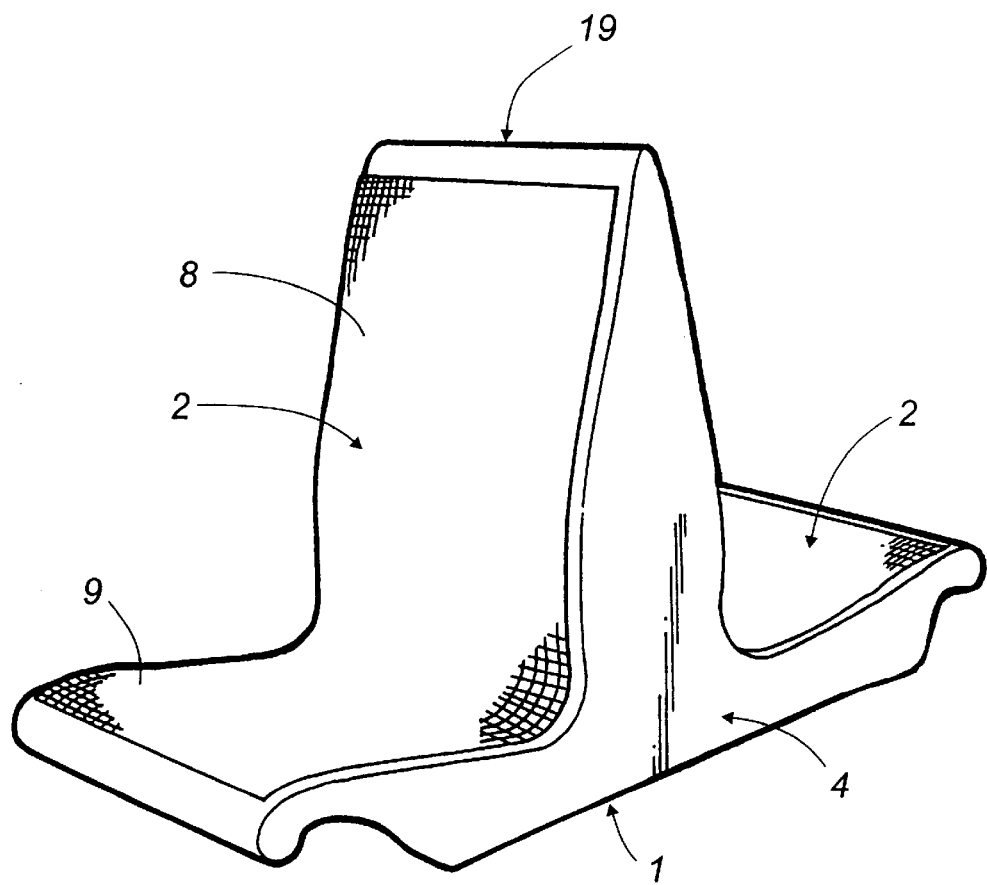
FIG. 8 is a perspective of a front of a two-person version of the invention with back-to-back suspended seats.
Figure 9:
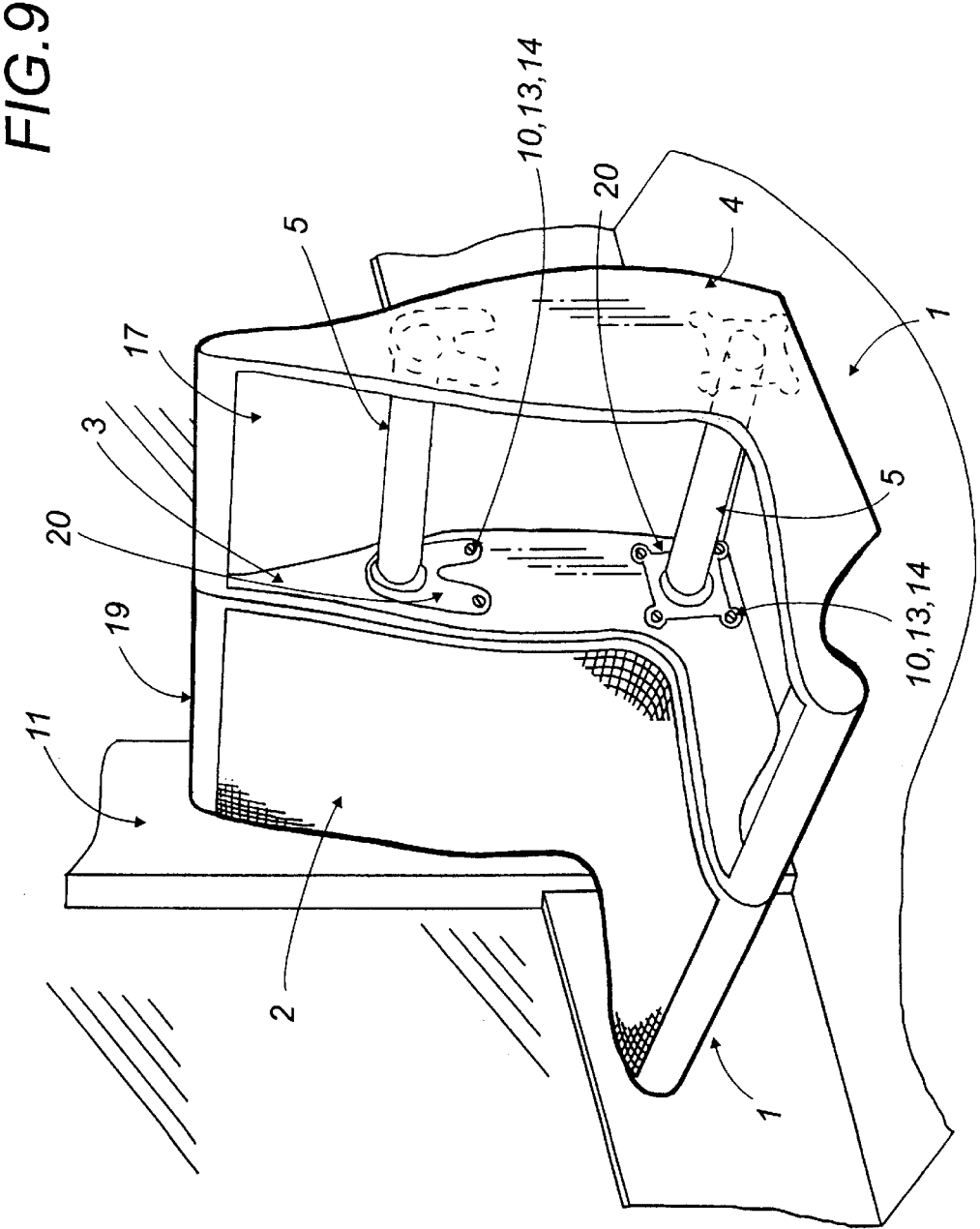
FIG. 9 is a perspective of a front of a two-person version of the invention with side-by-side suspended seats and with one of the seat supports removed.
Figure 10:
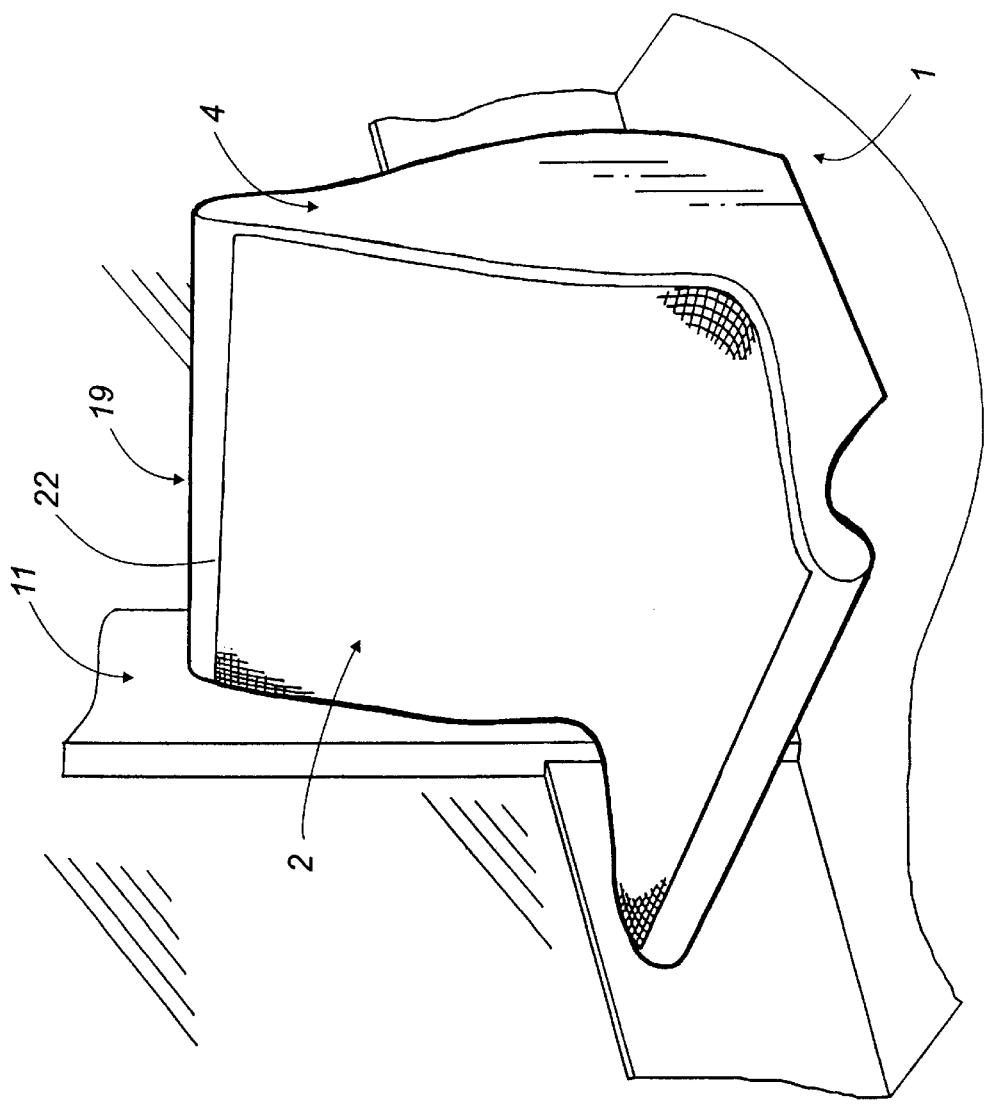
FIG. 10 is a perspective of a front of another two-person version with side-by-side suspended seats, formed of a single molded shell and a single seat support.

Without exceeding the scope of the invention, various embodiments of the body of seat 1 shown in FIGS. 8 through 10 can be conceived.

FIG. 8 shows a two-person version of the suspended seat in which the two seats are arranged back-to-back. The hollow shell forming the body of seat 1 comprises two lateral walls 3 and 4 that are generally shaped like an upside-down T, connected at the top by a narrow upper wall 19 and at the bottom by lower wall 16. As in the preceding embodiment, the hollow shell surrounds at least one and preferably two connecting and reinforcing cross pieces 5. Seat body 1 has two symmetrical openings such as openings 17 on its two opposite front and rear surfaces. Two seat supports 2 which may be identical, attached in the same way as before, close off these two openings 17 to form a complete seating unit allowing two passengers to sit simultaneously back-to-back.

Figure 3:
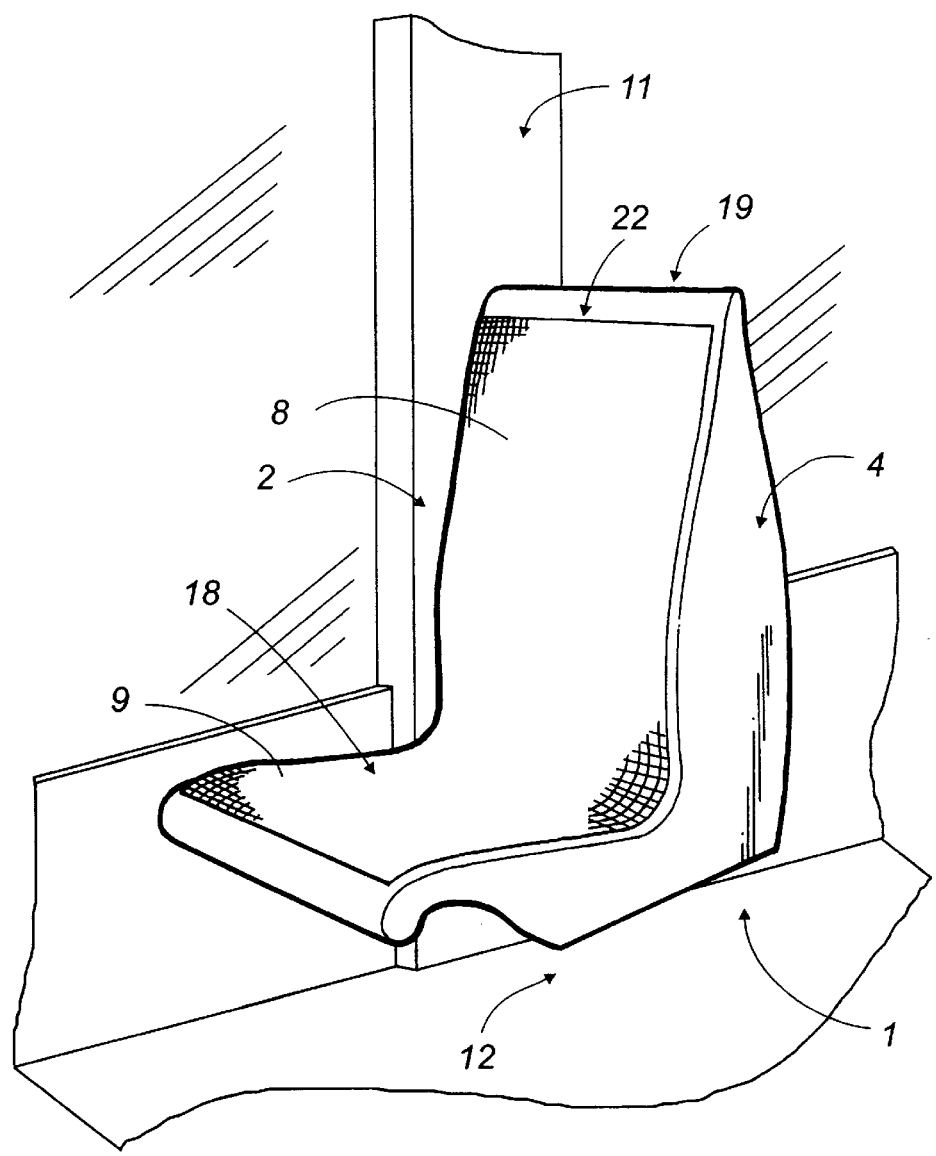
FIG. 3 is a complete perspective view of the front of one embodiment of the basic single-person suspended seat according to the present invention.
Figure 4:
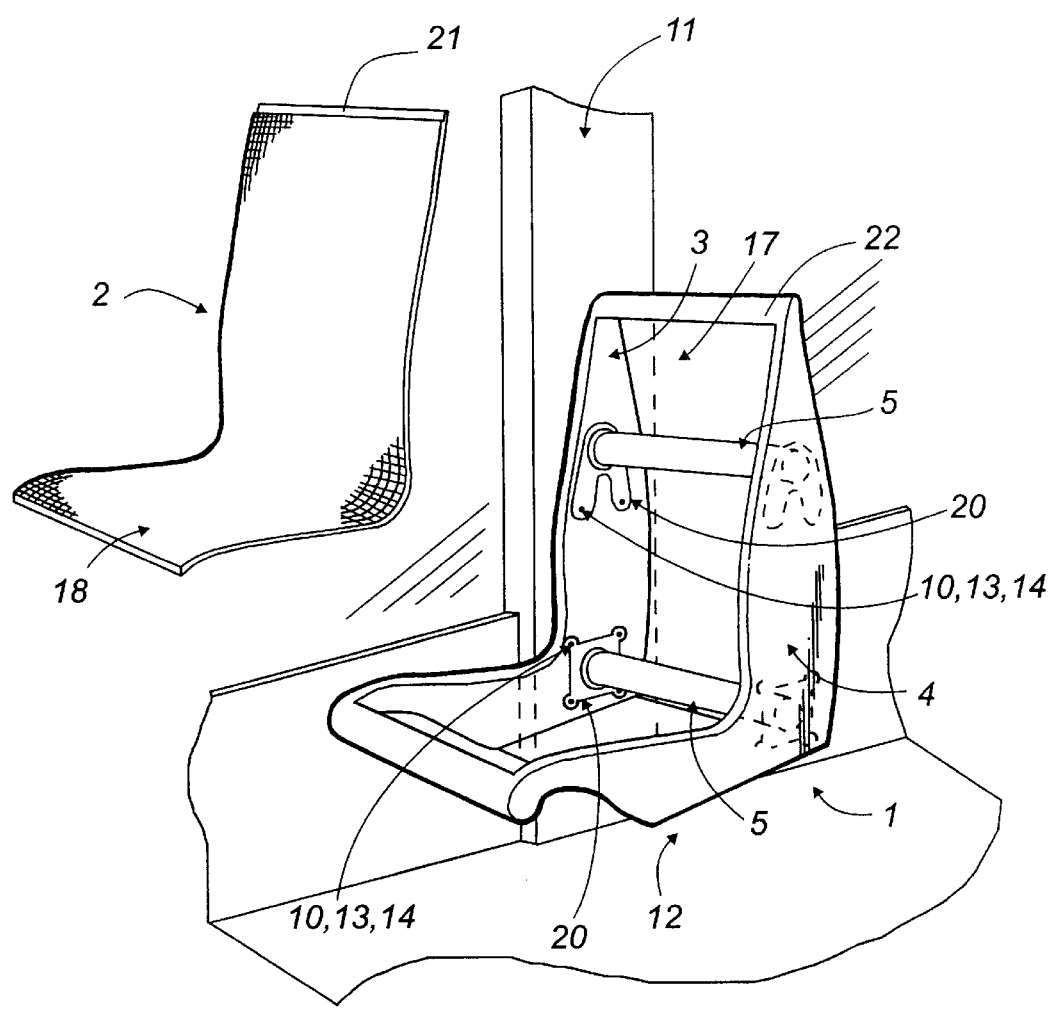
FIG. 4 is a perspective view similar to that of FIG. 3 of the front of a suspended seat according to the invention, but with the seat support shown offset in space.
Figure 5:
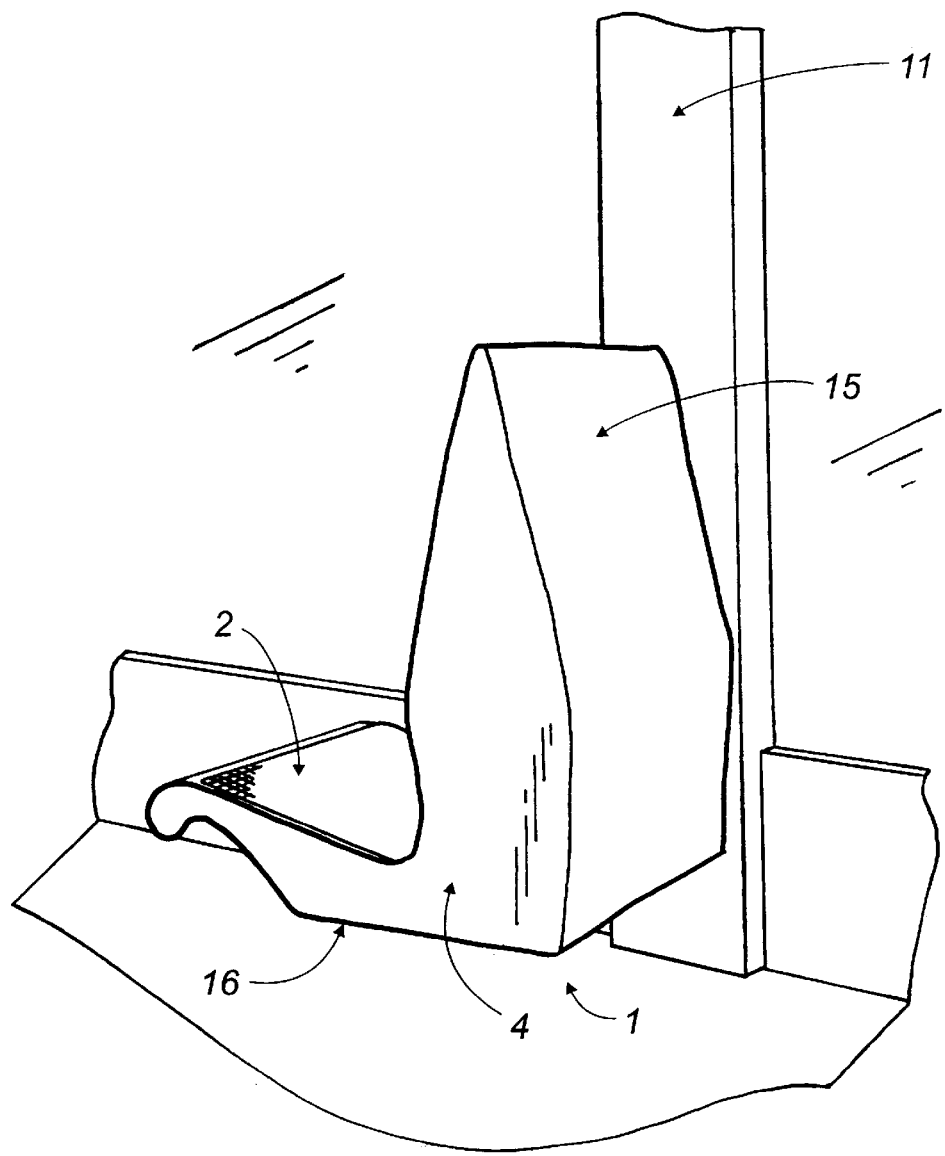
FIG. 5 is a perspective of a rear of the basic single-person version of the suspended seat according to the invention.

The embodiment in FIG. 10 differs from the basic version illustrated in FIG. 3 only by the increased width of rear walls 15, lower wall 16 and upper wall 19 and by the increased length resulting from connecting and reinforcing element or elements 5. The size of opening 17 on the front surface has also been increased to accommodate insertion of a larger seat support 2 which can seat several passengers. The result is a multi-person banquette type of seat.

A variation consisting of two banquettes placed back-to-back is also possible.

Seat support 2 may be formed of a single piece, either with or without a demarcation to indicate the separation between individual seats. It may also consist of the juxtaposition of several individual seat supports.

Advantageously, it may also be made from a very long, shaped piece sectioned into lengths adapted to the desired banquette width.

Regardless of the embodiment, the seat according to the invention comprises on at least one of its lateral walls 3 or 4, an attachment means 10 for laterally attaching the seat to a vertical structural element 11 or to a wall of the car which will be furnished with seats.

For the seats in FIGS. 3 through 10, this attachment means consists of a system of openings 14 cooperating with a system of bolts 13 to maintain the seat on structural element 11. Openings 14, which may number 6, are formed through the wall of side pieces 3 or 4, preferably at the thicker, reinforcing ear-like portions 20.

As before, the opposite side wall, for example wall 4, may also have openings 14 so the seat can be attached to any structural element 11 on either side or joined to an identical individual seat. This makes it very easy to form a multi-person banquette type of seat such as the embodiment in FIG. 10, described previously. This embodiment has been shown in FIG. 9. Two two-person seats can also be connected in this way with the seats back-to-back, forming a suspended unit providing seating for four passengers.

The suspended seat, according to the invention, can be positioned very easily and in a very short time. To do this, one merely positions the molded shell forming the body of seat 1 on a suitable structural support at a height from the floor that will offer comfortable seating. Lateral wall 3 or 4 of seat body 1 is attached to structural element 11 with bolts 13 through openings 14. The bolts are positioned through opening 17 of the seat body. The opening is large enough to allow comfortable installation. Seat support 2 is then placed across opening 17, closing it. Its upper extremity 21 can be slid below the upper edge 22 of opening 17, with the unit being held in place by a simple pin.

The seat, cantilevered from the support, is thus suspended above the floor. Lower space 12 below the seat is completely free, offering all the features outlined above.

Figure 6:
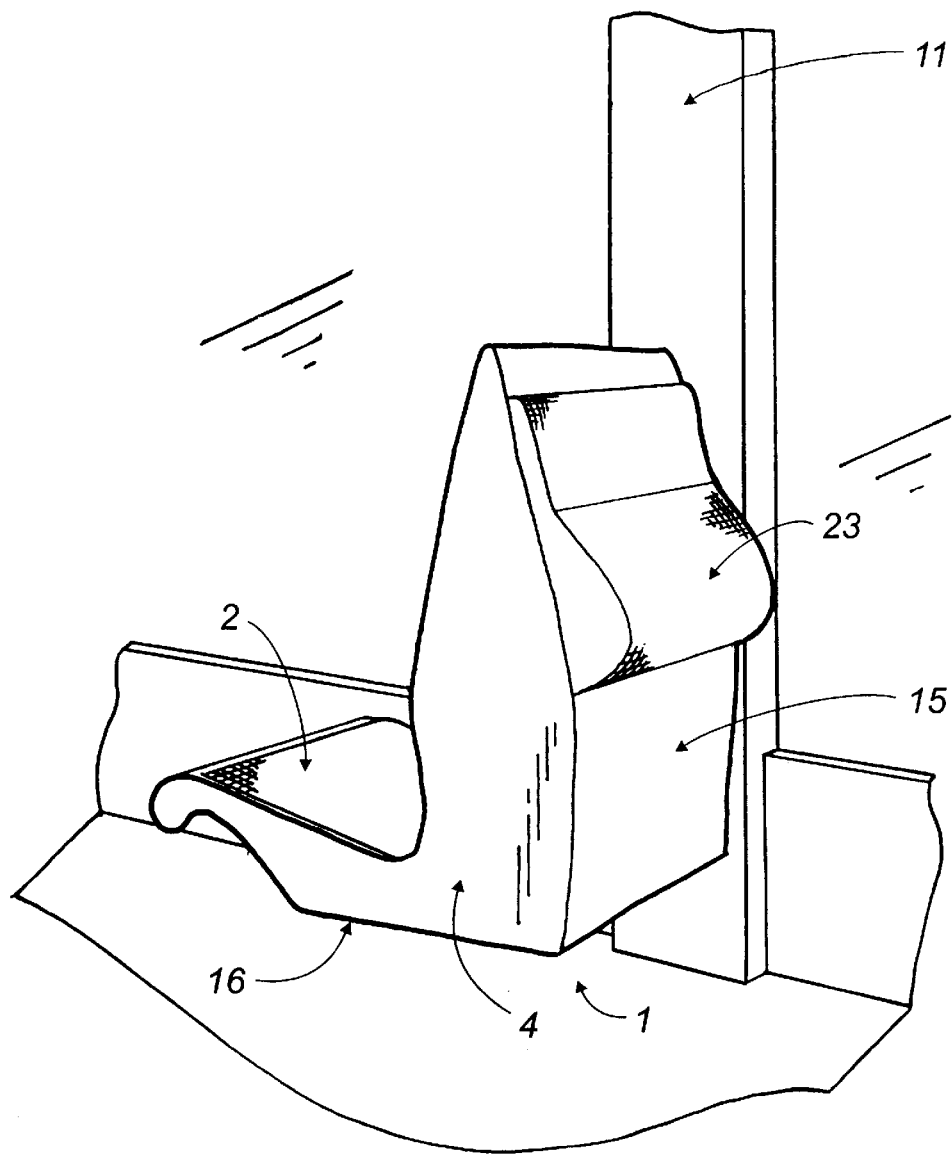
FIG. 6 is a perspective of the rear of a single-person version of the suspended seat according to the invention, comprising a back support.

It is possible to add certain auxiliary elements to the seat of the invention. In particular, the rear surface of the seat may have a cushioned back support 23 as shown in FIG. 6 so the passenger standing behind the seat can rest his or her posterior against it in a "standing-seated" position that is less fatiguing than remaining upright and occupies less space in a crowded vehicle than a seated position.

The suspended seat, according to the invention, may also have armrests, a headrest 24, a gripping or restraint device 25 for passengers standing near the seat, or any other conceivable auxiliary device.

Gripping or restraint device 25 is preferably attached to the body of seat 1 only on the side piece 3 or 4 that is not attached to a vertical structural element 11 or to any other element of the body of the transportation vehicle.

The side pieces may have been previously configured to accommodate one or the other of the pieces or devices described above.

Figure 7:
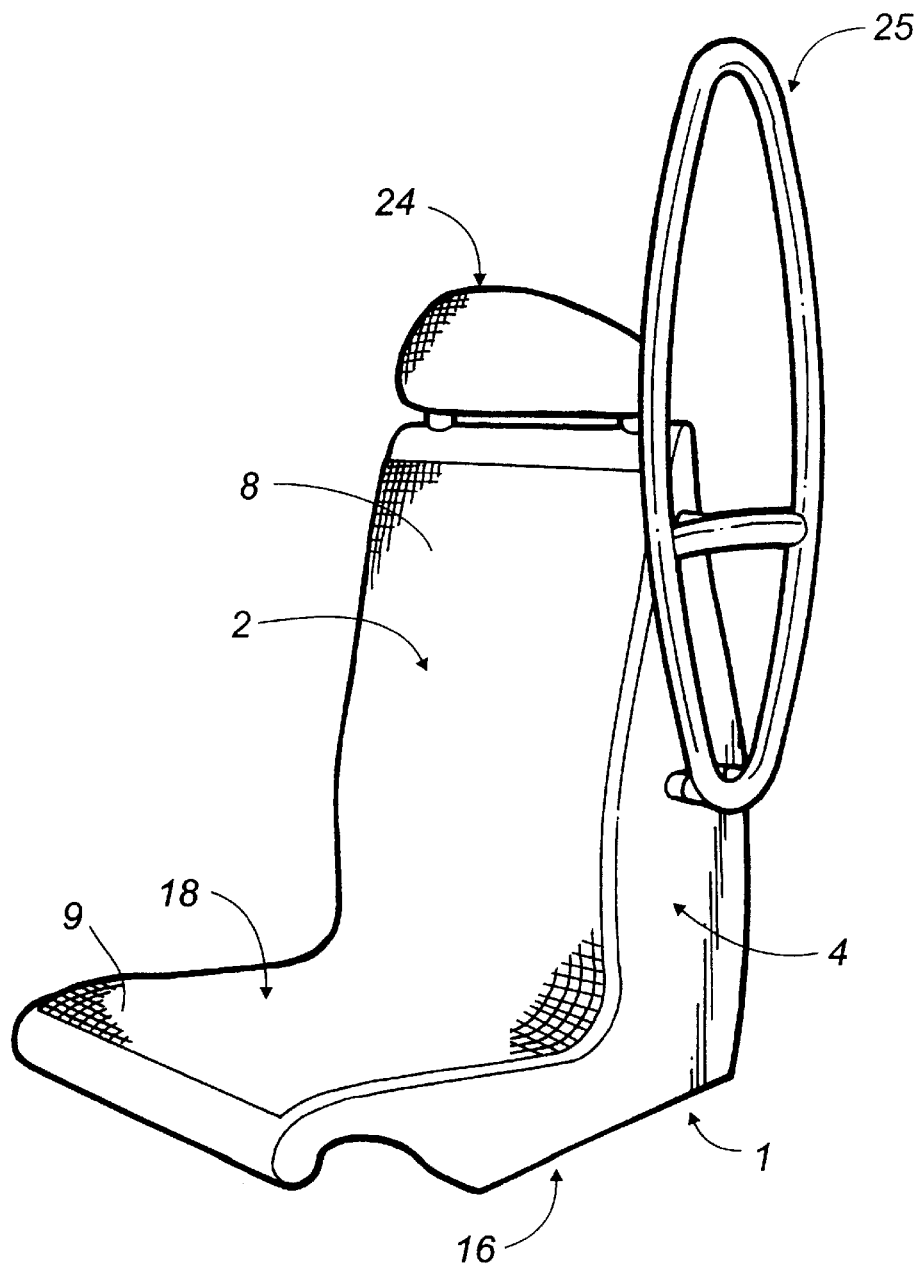
FIG. 7 is a perspective of the front of a single person version of the suspended seat, according to the invention, comprising a headrest and with a restraining device on its free lateral side.

Certain of these pieces, a headrest 24 and a hand grip restraint 25, are shown in FIG. 7. Obviously, the seat of the invention is not limited inclusion of these auxiliary elements, their dimension or shape, which are offered merely by way of example.

What is claimed is:

1. A single or multi-person suspended seat, banquette or other suspended seat for a passenger transportation vehicle, the suspended seat comprising:

two sides pieces (3 and 4) each having a vertical branch (6) and a horizontal branch (7), and the two side pieces (3 and 4) being joined to one another by at least one connecting and reinforcing cross piece (5) to form a seat body (1); and at least one seat support (2) covering the seat body (1); wherein one vertical branch (6) of the two side pieces (3 or 4) is attached to one of a vertical structural support (11) and a body of a transportation vehicle at an appropriate height above a floor of the transportation vehicle to form the suspended seat, while the horizontal branches (7) of the two side pieces (3 or 4) remain unattached to the transportation vehicle, so the suspended seat is cantilevered to one of the structural support (11) and the body of the transportation vehicle solely by the one vertical branch (6), and a width of the suspended seat is adjustable by varying a length of the at least one connecting and reinforcing cross piece (5) joining the two side pieces (3 and 4) together.

2. The suspended seat according to claim 1, wherein a grip or restraint device (25) is attached to the seat body (1) only to side piece (3 or 4) that is unattached to the transportation vehicle.

3. The suspended seat according to claim 1, wherein the seat support (2) is detachable from the suspended seat.

4. The suspended seat according to claim 1, wherein the seat body (1) is formed by a molding process.

5. The suspended seat according to claim 1, wherein the seat body (1) is a shell shaped like a hollow box.

6. The suspended seat according to claim 1, wherein the seat body (1) has an opening (17) formed in a front surface thereof which is covered by the seat support (2).

7. The suspended seat according to claim 1, wherein one of the length and an extension of the at least one connecting and reinforcing cross piece (5) is adjustable.

8. A single or multi-person suspended seat, banquette or other suspended seat for a passenger transportation vehicle, the suspended seat comprising:

two side pieces (3 and 4) each having a vertical branch (6) and a horizontal branch (7), the two side pieces (3 and 4) being joined together by at least one connecting and reinforcing cross piece (5) to form a seat body (1);

at least one seat support (2) covering the seat body (1);

one of the two side pieces (3 or 4) being attached only by its vertical branch (6) to a vertical structural support (11) or another element of a body of a transportation vehicle at an appropriate height so that the suspended seat is cantilevered to the structural support (11) or the body of the transportation vehicle, and a width of the suspended seat is determined by adjusting a length of the at least one connecting and reinforcing cross piece (5); and the connecting and reinforcing cross piece (5) is a telescoping structure to facilitate adjustment of one of a length and an extension of the connecting and reinforcing cross piece (5).

9. The suspended seat according to claim 8, wherein the connecting and reinforcing cross piece (5) comprises a locked tubular element that is blocked from pivoting.

10. The suspended seat according to claim 1, wherein the two side pieces (3 and 4) are connected by two tubular connecting and reinforcing cross pieces (5).

11. The suspended seat according to claim 1, wherein the seat support (2) is a generally rectangular plate which is contoured to accommodate a body of a passenger.

12. The suspended seat according to claim 1, wherein at least one of the side pieces (3 or 4) has a mechanism (14) for attachment to one of another seat and to one of the structural support (11) and the body of the transportation vehicle to be equipped with the suspended seat.

13. The suspended seat according to claim 12, wherein the two side pieces (3 and 4) both have a mechanism (14) for attachment to one of the structural support (11) and the body of the transportation vehicle to be equipped or to another seat of the transportation vehicle.

14. The suspended seat according to claim 1, wherein an attachment mechanism comprises openings (14) which cooperate with at least one pins, bolts (13) and screw elements for attaching the suspended seat to the vertical structural support of the transportation vehicle or for attaching the suspended seat to another seat.

15. The suspended seat according to claim 14, wherein at least one of the openings (14), formed in at least one of the two side pieces (3 or 4), is formed in at a thicker, reinforced portion (20) of the at least one side piece (3 or 4).

16. The suspended seat according to claim 1, wherein the seat support is sufficiently wide so as to accommodate simultaneously several passengers seated side-by-side.

17. The suspended seat according to claim 16, wherein the suspended seat is formed by laterally juxtaposing and connecting two seats together with one another.

18. The suspended seat according to claim 1, wherein the seat body supports the at least one seat support facing a first direction and supports a second seat support facing a second opposite direction and the first and second seat supports simultaneously accommodating several passengers seated back-to-back.

19. The suspended seat according to claim 18, wherein the second seat support is sufficiently wide for accommodating several passengers seated side-by-side.

20. The suspended seat according to claim 1, wherein the suspended seat has a layer of padding (18) and a covering protects the layer of padding (18) of the suspended seat.

21. The suspended seat according to claim 1, wherein the suspended seat further comprises at least one auxiliary element selected from the group comprising an armrest, a headrest (24), and a back support cushion (23).

* * * * *